(12) United States Patent
Helot et al.

(10) Patent No.: US 8,960,361 B2
(45) Date of Patent: Feb. 24, 2015

(54) CONTROL DEVICE FOR A MOTOR VEHICLE

(75) Inventors: Jacques Helot, Ingolstadt (DE); Ulrich Beierlein, Ingolstadt (DE); Wouter Kets, Ingolstadt (DE); Imanuel Merk, Rio de Janeiro (BR)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 13/637,905

(22) PCT Filed: Mar. 19, 2011

(86) PCT No.: PCT/EP2011/001351
§ 371 (c)(1),
(2), (4) Date: Dec. 10, 2012

(87) PCT Pub. No.: WO2011/120639
PCT Pub. Date: Oct. 6, 2011

(65) Prior Publication Data
US 2013/0091971 A1    Apr. 18, 2013

(30) Foreign Application Priority Data
Mar. 27, 2010 (DE) .......... 10 2010 013 169

(51) Int. Cl.
*B60K 26/00* (2006.01)
*F16H 59/02* (2006.01)
*B60K 20/02* (2006.01)
(Continued)

(52) U.S. Cl.
CPC ........... *F16H 59/0278* (2013.01); *B60K 20/02* (2013.01); *B60K 20/08* (2013.01); *F16H 59/0217* (2013.01); *F16H 59/12* (2013.01)

USPC .......................... 180/326; 74/473.3

(58) Field of Classification Search
CPC ................ F16H 59/0217; G05G 9/047
USPC ............. 74/473.3, 469, 471 XY; 200/61.88; 180/326
See application file for complete search history.

(56) References Cited

U.S. PATENT DOCUMENTS 3,326,315 A * 6/1967 Richards ............ 180/336
5,161,422 A   11/1992 Suman et al.
5,315,900 A * 5/1994 Teeter ................ 477/165
(Continued)

FOREIGN PATENT DOCUMENTS

DE   100 29 612   1/2001
DE   199 52 241   5/2001
(Continued)

OTHER PUBLICATIONS

International Search Report for PCT/EP2011/001351, mailed Jul. 14, 2011.
(Continued)

*Primary Examiner* — Justin Krause
*Assistant Examiner* — Gregory Prather
(74) *Attorney, Agent, or Firm* — Staas & Halsey LLP

(57) ABSTRACT

A control device for a motor vehicle has a manually controllable drive position selector element and a control element for controlling secondary functions of the motor vehicle. The drive position selector element and the control element for the secondary functions are attached to a common base body which is movable relative to an interior lining part of the motor vehicle. The drive position selector element is designed such that it can be used as a hand rest for the control element for the secondary functions.

14 Claims, 3 Drawing Sheets

(51) Int. Cl.
   *B60K 20/08*     (2006.01)
   *F16H 59/12*     (2006.01)

(56) References Cited

U.S. PATENT DOCUMENTS

| | | | |
|---|---|---|---|
| 5,481,077 A * | 1/1996 | Clegg et al. | 200/61.88 |
| 5,519,256 A * | 5/1996 | Goodridge | 307/10.8 |
| 5,528,953 A * | 6/1996 | Steinle et al. | 74/473.3 |
| 5,566,586 A * | 10/1996 | Lauer et al. | 74/523 |
| 5,957,001 A * | 9/1999 | Gualtieri et al. | 74/473.12 |
| 6,065,560 A * | 5/2000 | Palmeri et al. | 180/326 |
| 6,304,249 B1 * | 10/2001 | Derocher et al. | 345/163 |
| 6,448,670 B1 * | 9/2002 | Onodera et al. | 307/10.1 |
| 6,564,661 B2 * | 5/2003 | DeJonge | 74/335 |
| 6,596,950 B2 * | 7/2003 | Danek | 200/11 R |
| 6,661,114 B2 * | 12/2003 | Syamoto | 307/10.1 |
| 6,694,838 B2 * | 2/2004 | Ersoy | 74/473.1 |
| 6,746,067 B2 * | 6/2004 | Schmidt et al. | 296/37.13 |
| 6,848,332 B2 * | 2/2005 | Hayashi et al. | 74/473.33 |
| 6,889,812 B2 * | 5/2005 | Wendeberg et al. | 192/219.4 |
| 6,904,822 B2 * | 6/2005 | Meyer et al. | 74/335 |
| 6,928,350 B2 * | 8/2005 | Melnyk et al. | 701/36 |
| 7,458,432 B2 * | 12/2008 | Mayer et al. | 180/6.32 |
| 7,578,768 B2 * | 8/2009 | Tomasson et al. | 477/165 |
| 7,661,505 B2 * | 2/2010 | Spykerman et al. | 180/326 |
| 7,757,806 B2 * | 7/2010 | Bower | 180/326 |
| 8,104,566 B2 * | 1/2012 | Harber et al. | 180/315 |
| 8,146,704 B2 * | 4/2012 | Ruhter et al. | 180/326 |
| 8,516,915 B2 * | 8/2013 | Ulbrich et al. | 74/473.3 |
| 2002/0139212 A1 | 10/2002 | DeJonge | |
| 2003/0188594 A1 | 10/2003 | Levin et al. | |
| 2004/0011154 A1 * | 1/2004 | Dybro | 74/473.3 |
| 2004/0159487 A1 | 8/2004 | Wendeberg et al. | |
| 2008/0100086 A1 * | 5/2008 | Vermeersch et al. | 296/70 |
| 2012/0006139 A1 * | 1/2012 | Kim | 74/473.3 |

FOREIGN PATENT DOCUMENTS

| | | |
|---|---|---|
| DE | 698 06 680 | 12/2002 |
| DE | 103 17 901 | 11/2004 |
| DE | 60 2004 012 313 | 3/2009 |
| DE | 10 2008 023 231 | 11/2009 |
| DE | 10 2010 013 169.5 | 3/2010 |
| WO | PCT/EP2011/001351 | 3/2011 |

OTHER PUBLICATIONS

German Office Action for German Priority Patent Application No. 10 2010 013 169.5, issued Jan. 26, 2011.

Chinese Office Action dated May 20, 2014 from Chinese Patent Application No. 201180014922.2, 14 pages.

International Preliminary Report on Patentability for PCT/EP2011/001351, Oct. 11, 2012, 4 pages.

\* cited by examiner

CONTROL DEVICE FOR A MOTOR VEHICLE

CROSS REFERENCE TO RELATED APPLICATIONS

This application is based on and hereby claims priority to International Application No. PCT/EP2011/001351 filed on Mar. 19, 2011 and German Application No. 10 2010 013 169.5 filed on Mar. 27, 2010, the contents of which are hereby incorporated by reference.

BACKGROUND

The invention relates to a control device for a motor vehicle.

DE 103 17 901 B3 discloses a central console which is displaceable in the longitudinal direction of a motor vehicle in terms of its position relative to the motor vehicle.

DE 100 29 612 A1 describes a display and/or control unit in a motor vehicle, which display and/or control unit forms, with a ventilation unit, a structural unit which is arranged on the central console so as to be displaceable in the vehicle longitudinal direction.

The known solutions are however not suitable for use in modern motor vehicles because they provide the driver with an only inadequate level of comfort.

SUMMARY

It is one potential object to provide a control device for a motor vehicle by which both a transmission and also various secondary functions of the motor vehicle can be controlled, wherein the control device should provide the driver with the greatest possible level of comfort.

The inventors propose a control device for a motor vehicle that has a manually controllable drive position selector element and a control element for controlling secondary functions of the motor vehicle. The drive position selector element and the control element for secondary functions are attached to a common base body, which is movable relative to an interior lining part of the motor vehicle. The drive position selector element is designed such that it can be used as a hand rest for the control element for secondary functions As a result of the displaceability of the base body in which the drive stage selector element, that is to say a unit suitable for controlling the transmission, and the control element for controlling the secondary functions of the motor vehicle are arranged, a major proportion of the control elements by which the functions relevant to a driver can be controlled can be adjusted relative to the driver. Optimum adaptation of the control device for drivers of different size is possible in this way.

A particularly high level of comfort for the driver is provided in that the drive stage selector element is formed as a hand rest for the control element for the secondary functions, because this constitutes a highly ergonomic solution.

A further advantage of the proposed device is that, as a result of the integration of the drive stage selector element and the control element into one and the same base body, improved concentration of the individual control units with which the motor vehicle can be controlled is attained. This yields a less cluttered interior configuration.

Very simple locking and unlocking for the base body is attained if the control element for the secondary functions is formed as a locking element for the displacement of the base body.

To prevent inadvertent actuation of the drive stage selector element, it may be provided, in a further advantageous embodiment, that a locking element for activating the function of the drive stage selector element is arranged on the base body. It may for example be provided that an operator depresses the locking element if he wishes to perform a switch. The locking element may for example be designed such that, for switching, it must be simultaneously depressed and slid by the operator.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
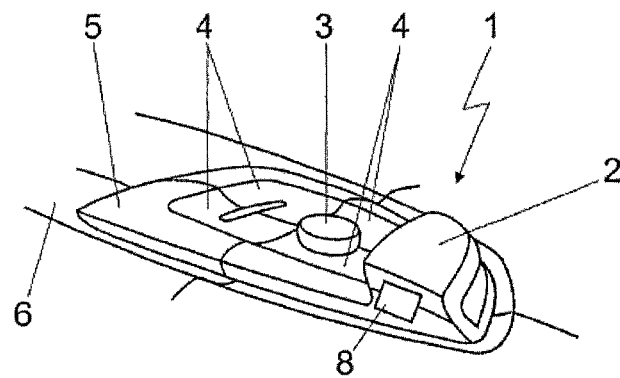
FIG. 1 shows a perspective view of a control device according to one of the inventors' proposals.

Reference will now be made in detail to the preferred embodiments of the present invention, examples of which are illustrated in the accompanying drawings, wherein like reference numerals refer to like elements throughout.

Figure 5:
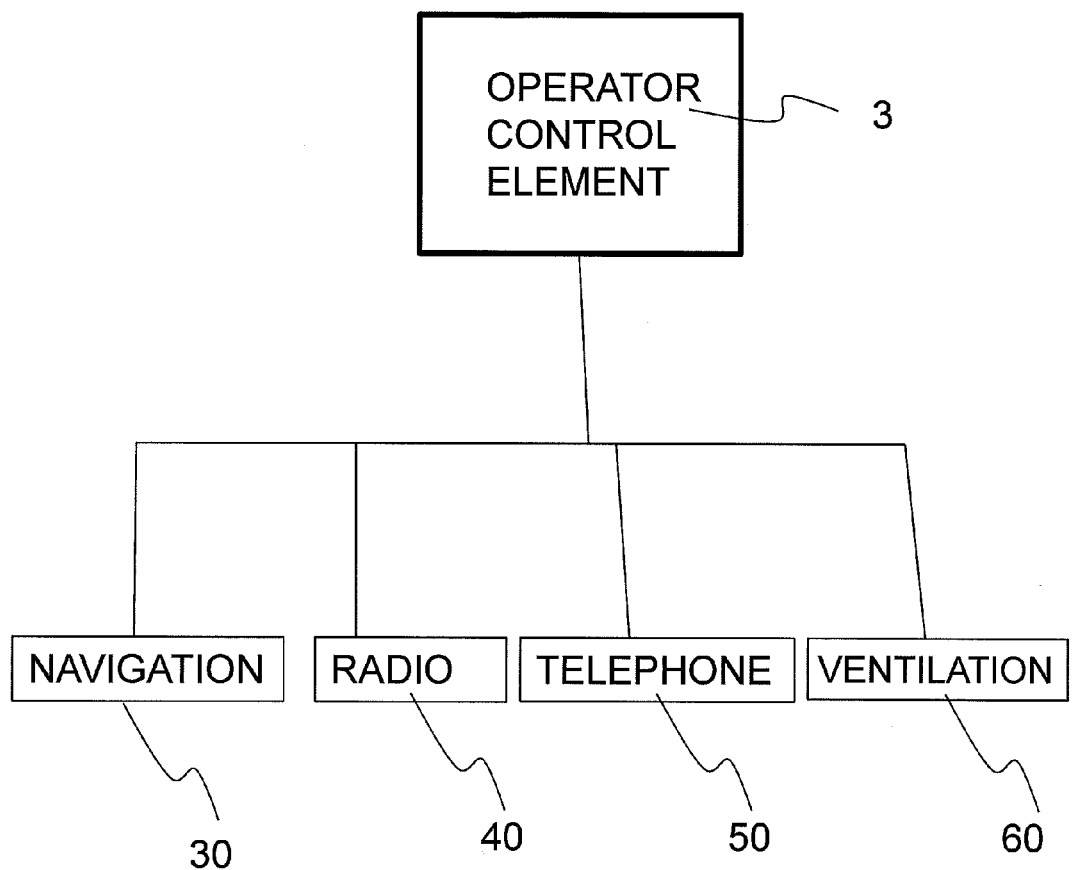
FIG. 5 shows a control element controlling example secondary functions of the motor vehicle.

FIG. 1 shows a control device 1 which is arranged in an interior space of a motor vehicle (not illustrated in its entirety). The control device 1 has a manually controllable drive stage selector element 2 and a control element 3 for controlling a plurality of secondary functions of the motor vehicle. The drive stage selector element 2 is provided for controlling a transmission (not illustrated) of the motor vehicle in order to change the drive stages with which the motor vehicle is operated. As shown in FIG. 5, control element 3 may be used for example to actuate units such as navigation systems 30, radio systems 40, hands-free telephone systems 50 or a ventilation system 60 of the motor vehicle 100. Furthermore, the control element 3 may be provided for adjusting certain parameters of the motor vehicle. In vehicles produced by the applicant, the control element 3 is also referred to as an MMI control element. In the present case, there are arranged adjacent to the control element 3 a plurality of buttons 4 by which likewise certain functions of the motor vehicle can be actuated. Instead of a rotary/push-type controller, as illustrated, the control element 3 and/or the buttons 4 could also be in the form of a touchpad.

Figure 6:
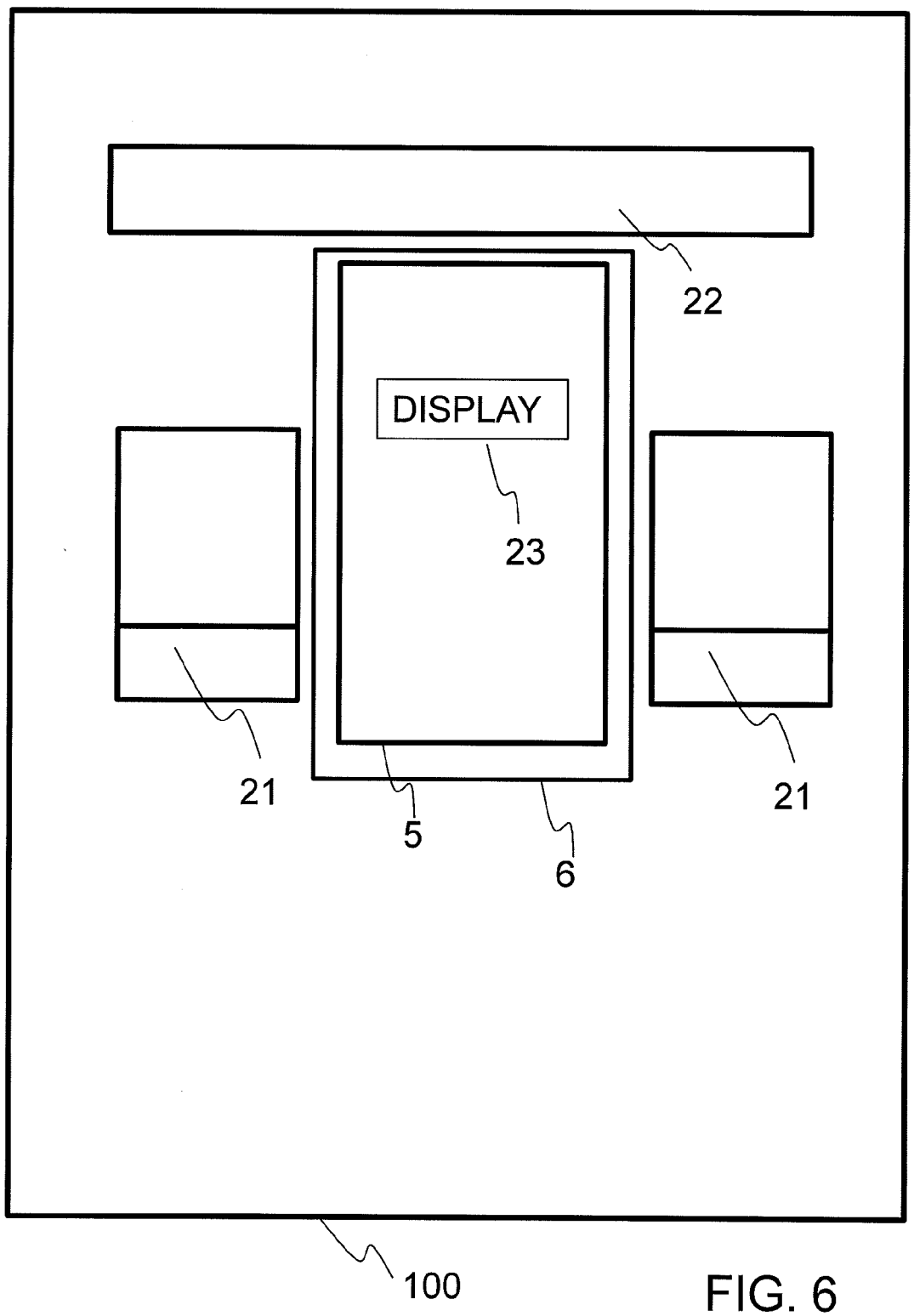
FIG. 6 shows a top view of an example motor vehicle interior configuration.

The drive stage selector element 2 and the control element 3 for the secondary functions, and in the present case also the buttons 4, are arranged on a common base body 5 which is displaceable relative to an interior lining component, in the present case a central console 6, of the motor vehicle. Instead of the central console 6, the interior lining component could for example also be in the form of a dashboard, a seat 21, an instrument panel 22 or if appropriate also a door lining, as shown in FIG. 6, for example, which is not drawn to scale.

Figure 2:
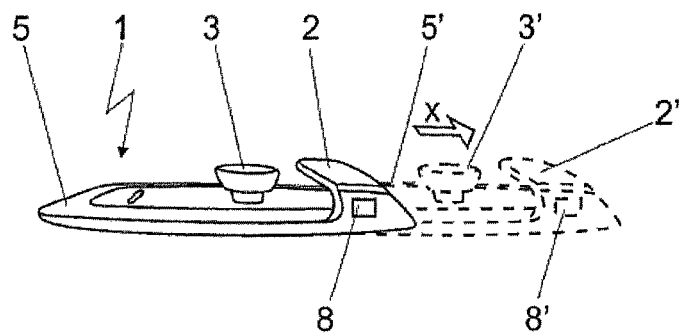
FIG. 2 shows a side view of the control device from FIG. 1 in two different positions.

The displaceability of the base body 5 relative to the central console 6 in the vehicle longitudinal direction denoted by "x" is indicated in FIG. 2 by the two different positions of the drive stage selector element 2 and of the control element 3. In the displaced, second position, illustrated by dashed lines, the base body, the drive stage selector element, the control element and the buttons are denoted by the reference numerals 5', 2', 3' and 4'.

Figure 3:
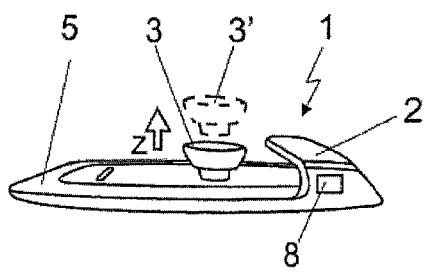
FIG. 3 shows a side view of the control device from FIG. 1 in two different positions.

To permit locking of the base body 5 in the individual positions, the control element 3 for the secondary functions is in the present case in the form of a locking element which can engage into one or more recesses (not illustrated) in the central console 6. The two positions of the control element 3 are illustrated in FIG. 3, wherein the control element 3 is denoted, in its upper position in which it releases the locking of the base body 5, by 3'. When the control element 3 is unlocked in the direction labeled "z", a displacement of the base body 5 is possible, wherein for the displacement, rails or the like may be provided on the central console 6.

In the present case, the drive stage selector element 2 is in the form of a hand rest, that is to say is formed such that the driver can rest his hand on the drive stage selector element 2. Here, the drive stage selector element 2 is arranged relative to the control element 3 such that, when the operator rests his hand on the drive stage selector element 2, he can control the control element 3 for the secondary functions. In this way, it is possible to dispense with hand rests and the like which are otherwise provided in the region.

Figure 4:
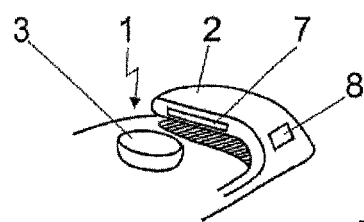
FIG. 4 shows a further perspective view of a proposed control device.

The control of the transmission (not illustrated) by the drive stage selector element 2 may be realized firstly through displacement of the drive stage selector element 2 in the vehicle longitudinal direction denoted by "x" in FIG. 2. Here, it is preferable for the drive stage selector element 2 to be connected to the base body 5 in such a way that haptic feedback for a user is provided during the displacement of the drive stage selector element. Alternatively or in addition, the drive stage selector element 2 may also have a touch-sensitive panel 7, as illustrated in FIG. 4, by which the drive stages of the transmission can be selected. In the latter case in particular, it is preferable if the drive stage selector element 2 has no mechanical connection to the transmission in which the drive stages can be selected by the drive stage selector element 2. Such an embodiment, a so-called shift by wire, is however also conceivable in the former case, in which the drive stage selector element 2 is displaceable in the longitudinal direction x of the motor vehicle. The touch-sensitive panel 7 could for example be divided into two portions, wherein an upshift could be possible in one portion and a downshift could be possible in the other portion.

Even though the drive stage selector element 2 is in principle also conceivable for controlling a manual transmission, it is better suited to an automatic transmission. If the drive stage selector element 2 is used for a manual transmission, it should be ensured that a suitable connection of the drive stage selector element 2 to the transmission is possible despite the displaceability of the drive stage selector element relative to the base body 5. An electronic shift of the drive stages in the manual transmission would however also be conceivable if appropriate, for example if a shift-by-wire system is used. The use of such a system is self-evidently also possible in the case of automatic transmissions.

It can also be seen in FIG. 4 that there is mounted on the base body 5 a switch element 8 which serves for the activation and deactivation of the function of the drive stage selector element 2. With the switch element 8, it is thus possible to activate and deactivate the drive stage selector element 2 such that an inadvertent actuation of the drive stage selector element 2 can be prevented, for example if the vehicle is being operated in the purely automatic mode. In an embodiment which is illustrated in FIG. 6 by way of example, and which is not drawn to scale, it may furthermore be provided that a display 23 for displaying the selected drive stage is arranged on the base body 5.

A further embodiment may have the element 7 being designed as a switch element and locking element, and the gearshift being realized by sliding the drive stage selector element 2 when the locking element 7 is actuated.

The movement of the base body 5 with the drive stage selector element 2 and the control element 3 mounted thereon could also be coupled to the activation of the adjustment for a vehicle seat (not illustrated), such that when the vehicle seat is adjusted, the base body 5 could also be moved into a position suitable for a person sitting on the vehicle seat. Accordingly, the adjustment of the base body 5 could also be integrated into a memory function such as is known per se. The electronic and/or automatic adjustment of the base body 5 could nevertheless be configured such that the base body 5 could nevertheless be manually adjusted if required.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

The invention claimed is:

1. A control device for a motor vehicle, comprising:
a manually controllable drive stage selector element; and
a control element to control secondary functions of the motor vehicle, wherein the drive stage selector element is formed such that it can be used as a hand rest for control of the control element,
the drive stage selector element and the control element are mounted on a common base body which is displaceable relative to an interior lining part of the motor vehicle, and
the drive stage selector element and common base body are translatable in a longitudinal direction of the motor vehicle to select the drive stages,
wherein the control element unlocks the common base body from the interior lining part to enable the common base body to be translated in the longitudinal direction of the motor vehicle,
the drive stage selector element and the control element are mounted on a surface of the common base body which is externally exposed to an interior driver space of the motor vehicle,
the control element unlocks the common base body from the interior lining part through movement of the control element in a first vertical direction to a first position, and locks the common base body to the interior lining part through movement of the control element in a second vertical direction, opposite of the first vertical direction, to a second position,
wherein the first vertical direction is an upward vertical direction relative to ground, and is substantially perpendicular to the longitudinal direction of the motor vehicle.

2. A control device according to claim 1, wherein
the drive stage selector element is translatable relative to the interior lining part of the motor vehicle to select the drive stages, and
the common base body has a position relative to the interior lining part, that indicates which drive stage is currently selected.

3. The control device according to claim 2, wherein
the common base body is translatable relative to the interior lining part, to indicate which drive stage is currently selected, to indicate drive stage selection, and for driver comfort,
translation of the common base body for driver comfort is controlled by displacement of a vehicle seat, and
translation of the common base body for driver comfort does not change the drive stage currently selected.

4. A control device according to claim 1, wherein
the drive stage selector element is connected to the common base body, and
haptic feedback is provided to a user during displacement of the drive stage selector element.

5. A control device according to claim 1, further comprising a switch element to activate the drive stage selector element, the switch element being arranged on the common base body.

6. The control device according to claim 1, wherein
the drive stage selector element is translatable relative to the interior lining part of the motor vehicle to select the drive stages,
the drive stage selector element comprises a switch element displaceable relative to the common base body, the switch element being arranged on the common base body,
displacement of the switch element relative to the common base body locks and unlocks the common base body from the interior lining part, and
the common base body has a position relative to the interior lining part, that indicates which drive stage is currently selected.

7. The control device according to claim 6, wherein
the common base body is translatable relative to the interior lining part, to indicate which drive stage is currently selected, to indicate drive stage selection, and for driver comfort,
translation of the common base body for driver comfort is controlled by displacement of a vehicle seat, and
translation of the common base body for driver comfort does not change the drive stage currently selected.

8. The control device according to claim 1, wherein
the drive stage selector element has no mechanical connection to a transmission in which the drive stages are selected.

9. The control device according to claim 1, wherein
the interior lining part is a central console, a seat or an instrument panel.

10. The control device according to claim 1, wherein
translation of the common base body relative to the interior lining part is coupled to displacement of a vehicle seat.

11. The control device according to claim 1, wherein
a display to display the drive stage currently selected is arranged on the common base body.

12. The control device according to claim 1, wherein
the interior lining part includes a central console, and
displacement of the control element relative to the common base body locks and unlocks the common base body from the central console.

13. The control device according to claim 1, wherein
the control element is used to control secondary functions for at least two motor vehicle systems among a navigation system, radio system, telephone system, and climate control system.

14. The control device according to claim 1, further comprising a plurality of buttons mounted on the common base body,
wherein the control element is disposed between the plurality of buttons and the drive stage selector element on the common base body.

* * * * *